United States Patent [19]

Hasebe et al.

[11] Patent Number: 5,032,475
[45] Date of Patent: Jul. 16, 1991

[54] NICKEL-METAL HYDRIDE SECONDARY CELL

[75] Inventors: Hiroyuki Hasebe; Kazuta Takeno; Kiyoshi Mitsuyasu; Yuji Sato; Hiroyuki Takahashi; Hirotaka Hayashida, all of Yokohama; Ichirou Sawatari, Oomiya; Koji Ishiwa, Yokohama; Katuyuki Hata, Yamato; Kazuhiro Yoshida, Yokohama; Kunihiko Sasaki, Kawasaki, all of Japan

[73] Assignees: Toshiba Battery Co., Tokyo; Kabushiki Kaisha Toshiba, Kawasaki, both of Japan

[21] Appl. No.: 584,115

[22] Filed: Sep. 18, 1990

[30] Foreign Application Priority Data

Sep. 18, 1989 [JP] Japan .................. 1-240067
Sep. 18, 1989 [JP] Japan .................. 1-240070
Sep. 21, 1989 [JP] Japan .................. 1-243306
Oct. 31, 1989 [JP] Japan .................. 1-281671
Oct. 31, 1989 [JP] Japan .................. 1-281672

[51] Int. Cl.$^5$ .................. H01M 4/52; H01M 10/34
[52] U.S. Cl. .................. 429/60; 429/206; 429/223
[58] Field of Search .................. 429/59, 60, 101, 206, 429/223, 218, 249; 252/182.1; 420/900

[56] References Cited

U.S. PATENT DOCUMENTS

| | | | |
|---|---|---|---|
| 3,951,686 | 4/1976 | Ness et al. | 429/223 X |
| 4,049,027 | 9/1977 | Seiger | 429/223 X |
| 4,636,445 | 1/1987 | Yamaho et al. | 429/101 X |
| 4,837,119 | 6/1989 | Jkoma et al. | 429/206 |
| 4,925,748 | 5/1990 | Jkoma et al. | 429/101 X |
| 4,935,318 | 6/1990 | Jkoma et al. | 429/206 |

Primary Examiner—Anthony Skapars
Attorney, Agent, or Firm—Oblon, Spivak, McClelland, Maier & Neustadt

[57] ABSTRACT

A nickel-metal hydride secondary cell comprising a non-sinter type nickel positive electrode accommodated in an enclosure and comprised of a conductive core and a layer formed on the conductive core, the layer made of a mixture of nickel hydroxide power and cobalt monoxide powder covered with a layer of high-valence cobalt oxide, a hydrogen absorbing alloy negative electrode accommodated in the enclosure and comprised of a conductive core and a layer formed on the conductive core and made of a mixture hydrogen absorbing alloy powder and carbon black having a specific surface area of 700 m$^2$/g or more, and having a capacity 1.0 to 2.5 times the sum of the capacity of the nickel hydroxide contained in the positive electrode and the electricity required to oxidize the cobalt monoxide powder, a separator made of synthetic resin unwoven fabric having a texture size of 50 to 100 g/m$^2$ and a thickness of 0.1 to 0.25 mm, and located between the positive electrode and the negative electrode, and alkali electrolyte contained in the enclosure.

10 Claims, 6 Drawing Sheets

NICKEL-METAL HYDRIDE SECONDARY CELL

BACKGROUND OF THE INVENTION

1. Field of the Invention

The present invention relates to a nickel-metal hydride secondary cell and more particularly, the same having an improved non-sinter type nickel positive electrode.

2. Description of the Related Art

As the up-to-date electronic technology has been advanced ensuring lower energy consumption and improved mounting techniques, most of electronic components which were unquestionably bulky become cordless and portable. Simultaneously, various secondary cells which serve as built-in power sources in electronic components are also requested to hold a higher amount of electrical energy. Among them, an alkali secondary cell has been developed and widely accepted which has a negative electrode fabricated by forming powder of a hydrogen absorbing alloy on an conductive core which serves as a collector. As compared with the cadmium negative electrode in a known alkali secondary cell, such a negative electrode of the hydrogen absorbing alloy provides a higher energy density in weight or volume thus ensuring higher energy storage in a cell. In addition, the characteristics of the cell can be improved and sill be less assaultable on the environment.

On the other hand, a known nickel positive electrode which determines the electricity storage of an alkali secondary cell and is commonly employed in a nickel-cadmium secondary cell, is made by sinter process. More specifically, the sinter-processed nickel positive electrode is made by performing the following sequence of steps. First, carbonyl nickel is coated on a punched metal member. Next, the carbonyl nickel-coated metal member is heated, thus sintering the carbonyl nickel coating, whereby a porous conductive core made is obtained. Then, the core is immersed in an aqueous solution containing nickel ions, whereby nickel hydroxide is formed in the pores open in the surfaces of the core, through chemical and electrochemical reactions. Finally, the core is electrically charged and discharged several times, in an alkali electrolyte. As understood, the disadvantage of this process is that the nickel positive electrode remains unreduced in the production cost due to the elaborate procedures and also, its sinter-processed core becomes increased in the size, preventing the improvement of electrical energy density.

To meet the requirements for higher storage and lower production cost of a secondary cell, a non-sinter type nickel positive electrode has been developed. The non-sinter type nickel positive electrode is fabricated by applying a paste, which is a mixture of nickel hydroxide powder and water with a binding medium, onto a conductive core of different shape formed of a 3-dimensional structure of formed metal, net-shaped metallic fabric, or other material for filling and then, pressing the core into a shape. The non-sinter type nickel positive electrode contains more active materials than the sinter-processed nickel positive electrode, ensuring more storage of electricity. Also, the procedure of production will need no elaborate steps including immersion and chemical procedures, unlike the sinter-process for the sinter-processed electrodes, thus encouraging mass-production and lowering the cost. However, a drawback in the non-sinter type nickel positive electrode is that the distance between each nickel hydroxide powder acting as an active material and a metallic matrix which constitutes the conductive core acting as a collector is about a few to several ten times greater than that of the sinter-processed nickel positive electrode, whereby the collector efficiency will decrease. As the result, the effectiveness of nickel hydroxide will decrease to 50 to 60g of the maximum causing a considerable decrease in the performance as compared with the sinter-processed nickel positive electrode.

To overcome the above drawback, the addition of cobalt compounds is proposed. The cobalt compounds include metallic cobalt, cobalt oxide, and cobalt hydroxide. Particularly, cobalt monoxide (CoO) exhibits a highly active characteristic and the addition of a small amount of the cobalt monoxide will ensure an increase in the effectiveness and collector efficiency of any nickel positive electrode.

The cobalt monoxide is however highly reactive with oxygen in the air and when oxidized to the deep in each cobalt monoxide powder, its inherent property will be eliminated. Also, when the oxidization of the cobalt monoxide is abruptly proceeded, the risk of ignition becomes high. It is then required to fabricate non-sinter type nickel positive electrodes in the inactive atmosphere of e.g. nitrogen or argon gas, which will result in the difficulty of mass-production.

A paste type positive electrode for an alkali storage cell is disclosed in Japanese Patent Disclosure (Kokai) No.61-183868 by Uramoto et al., in which 5 to 30% by weight of cobalt monoxide (CoO) powder is mixed with a composition of active powder materials in the eutectic state consisting of 85 to 95 mol % of nickel hydroxide, 3 to 8 mol % of cobalt hydroxide, and 2 to 7 mol % of cadmium hydroxide. Such a paste type positive electrode which contains highly poisonous cadmium as an active material, will cause disgrace to the environment when disposed without proper arrangement.

SUMMARY OF THE INVENTION

It is an object of the present invention to provide a nickel-metal hydride secondary cell in which the effectiveness of a positive electrode is improved.

It is another object of the present invention to provide a nickel-metal hydride secondary cell in which the characteristics of charge and discharge at higher current are improved.

It is a further object of the present invention to provide a nickel-metal hydride secondary cell in which an increase in the inner pressure during cycle operation of charge and discharge is eliminated.

It is a still further object of the present invention to provide a nickel-metal hydride secondary cell in which the exhaustion of an alkali electrolyte in a separator during the repeated operation of charge and discharge cycle is prevented increasing the operative life of the cell.

It is still another object of the invention to provide a nickel-metal hydride secondary cell whose characteristic deterioration is minimized over a long period of time, even if subjected to over discharging.

Specifically, a nickel-metal hydride secondary cell according to the present invention comprises a non-sinter type nickel positive electrode accommodated in an enclosure and comprised of a conductive core and a layer formed on the conductive core, the layer made of a mixture of nickel hydroxide powder and cobalt monoxide powder covered with a layer of high-valence cobalt oxide, a hydrogen absorbing alloy negative electrode accommodated in the enclosure and comprised of a conductive core and a layer formed on the conductive core and made of a mixture hydrogen absorbing alloy powder and carbon black having a specific surface area of 700 m$^2$/g or more, and having a capacity 1.0 to 2.5 times the sum of the capacity of the nickel hydroxide contained in the positive electrode and the electricity required to oxidize the cobalt monoxide powder, a separator made of synthetic resin unwoven fabric having a texture size of 50 to 100 g/m$^2$ and a thickness of 0.1 to 0.25 mm, and located between the positive electrode and the negative electrode, and alkali electrolyte contained in the enclosure.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A nickel-metal hydride secondary cell according to the present invention will be described referring to FIG. 1.

A non-sinter type nickel positive electrode 1 spaced by a separator 3 made of synthetic resin nonwoven material from a hydrogen absorbing alloy negative electrode 2 is arranged in spiral form and accommodated within an enclosure 4 of cylindrical form with its bottom closed. The enclosure 4 also contains an amount of alkali electrolyte. In the upper opening of the enclosure 4, there is provided a closing plate 6 of circular shape having an aperture 5 in the center thereof. Also, an annular insulation gasket 7 is provided between the circumference of the closing plate 6 and the inner upper opening end of the enclosure 4, in which the closing plate 6 is airtightly mounted to the enclosure 4 by sealing with the gasket 7 while radially reducing the upper opening end of the enclosure 4. A positive electrode lead line 8 is coupled at one end to the positive electrode 1 and at the other end to the lower surface of the closing plate 6. Also, a positive electrode terminal 9 of hat-like shape is mounted onto the closing plate 4 so as to cover the aperture 5. There is a rubber safety valve 10 provided in a space defined by the closing plate 4 and the positive electrode terminal 9 so that the aperture 5 is closed up.

The non-sinter type nickel positive electrode 1 is made by forming a mixture of active materials of nickel hydroxide powder and cobalt monoxide (CoO) powder covered with a layer of high-valence cobalt oxide with a polymer birding medium on a conductive core which serves as a collector.

The high-valence cobalt oxide, which covers the cobalt monoxide contained in the electrode 1 is a divalence one or a higher-valence one, such as $Co_2O_3$ or $Co_3O_4$. The word "covers" means that the high-valence cobalt oxide covers part of the surface areas of the cobalt monoxide powder, preferably about 90% or more of their surface areas. A layer of the high-valence cobalt oxide is formed by sintering the cobalt hydroxide in non-oxide atmosphere, thus forming cobalt monoxide powder, and then by oxidizing only the surface of the cobalt monoxide powder. The amount of the high-valence cobalt oxide layers is preferably 0.1 to 20% by weight as compared with the cobalt monoxide powder. This is because the oxidization can hardly be controlled if the amount of the high-valence cobalt oxide layers is less than 0.1% by weight. If the amount of the high-valence cobalt oxide layers exceeds 20% by weight, a chemical activity of the cobalt monoxide powder will decrease.

The amount of the cobalt monoxide powder contained in the mixture for the positive electrode 1 is preferably 2 to 20% by weight as compared with the nickel hydroxide. This is because the utilization of the non-sinter type nickel positive electrode will be not improved if the amount of the cobalt monoxide powder is less than 2% by weight. If the amount of the cobalt monoxide powder is over 20%, the amount of the cobalt hydroxide powder in the positive electrode will be decreased lowering the electrode capacity. Also, the amount of electricity required to oxidize the cobalt monoxide irreversibly in the region of practical usable current will increase, and the charge-reserving capacity of the negative electrode made of the hydrogen absorbing alloy will inevitably decrease. As a result, the capacity (hydrogen absorbing capacity) at the negative electrode may decrease at the relatively early stage of charge and discharge cycle operation, thus causing an increase in the inner pressure.

The binding medium in the mixture for the positive electrode 1 may be polyacrylate, e.g. potassium polyacrylate and sodium polyacrylate, and/or carboxymethylcellulose (CMC). The amount of the binding medium in the mixture is preferably 0.1 to 2% by weight as compared with the nickel hydroxide.

The conductive core for the positive electrode 1 may be of a 2-dimensional metal structure, e.g. a punched metal, an expanded metal, or a net, or a 3-dimensional metal structure of e.g. foamed metal or net-shaped metallic fabric.

The positive electrode 1 is thus made by mixing the nickel hydroxide powder and the cobalt monoxide powder covered with a layer of high-valence cobalt oxide with the binding medium under the presence of water for producing a paste, applying the paste to the conductive core, and drying and roller pressing the same.

The hydrogen absorbing alloy negative electrode 2 is made by forming a layer of a mixture of hydrogen absorbing alloy powder, conductive material powder, and binding medium on a conductive core which serves as a collector.

The hydrogen absorbing alloy in the mixture for the negative electrode 2 is not particularly specified and may be any material which can absorb hydrogen generated in an electrolyte by electrochemical reaction and then, emit absorbed hydrogen during the discharge and for example, is represented by the general formula, $XY_{5-a}Za$ (where X is a rare earth element, e.g. La, Y is Ni, Z is at least an element selected from Co, Mn, Ag, V, Cu and B, and is $0 \leq a < 2.0$); namely, $LaNi_5$, $MmNi_5$ (Mm: misch-metal), $LmNi_5$ (Lm: lanthaniumrich misch-metal), and the like in which Ni is partially replaced by Al, Mn, Fe, Co, Ti, Cu, Zn, Zr, Cr or B.

The conductive material powder in the mixture for the negative electrode 2 may be carbon black, graphite, acetylene black or the like. Particularly, in view of preventing a voltage drop at the negative electrode when a current is introduced, carbon black is most preferred having a specific surface area of more than 700 $m^2/g$ and preferably, 800 $m^2/g$. Namely, the carbon black may be furnace black, etc. The specific surface of the carbon black should be limited because if it is less than 700 $m^2/g$, the absorption and emission of hydrogen of the hydrogen absorbing alloy powder contained in the negative electrode 2 will hardly be enhanced and the voltage drop becomes inevitable. More preferably, the carbon black may have a 3-dimensional chain structure resulting from the secondary agglomeration of carbon particles (primary particles) of about 10 to 30 nm diameter.

The amount of the conductive material powder in the mixture for the negative electrode 2 is preferably 0.1 to 4 parts by weight corresponding to 100 parts by weight of the hydrogen absorbing alloy powder. This is because the electrical connection between the hydrogen absorbing alloy powder or between the hydrogen absorbing alloy powder and the conductive core will hardly be improved if the amount of the conductive material powder is less than 0.1 part by weight. Also, if the amount of the conductive material powder exceeds 4 parts by weight, the amount of the hydrogen absorbing alloy powder in an area of the negative electrode will be decreased ensuring an unsatisfactory amount of storage electricity. Preferably, the amount of the conductive material powder is 0.1 to 2 parts by weight corresponding to 100 parts by weight of the hydrogen absorbing alloy powder.

The binding medium in the mixture for the negative electrode 2 may be polyacrylate, e.g. potassium polyacrylate and sodium polyacrylate, fluorine resin, e.g. polytetrafluoroetylene (PTFE) or carboxymethylcellulose (CMC). The amount of the binding medium in the mixture is preferably 0.1 to 5 parts by weight corresponding to 100 parts by weight of the hydrogen absorbing alloy powder.

The conductive core for the negative electrode 2 may be of a 2-dimensional metal structure, e.g. a punched metal, an expanded metal, or a net, or a 3-dimensional metal structure of e.g. foamed metal or net-shaped metallic fabric.

The negative electrode 2 is thus made by mixing the hydrogen absorbing alloy powder and the conductive material powder with the binding medium under the presence of water to have a paste, applying the paste to conductive core, and drying and roller pressing the same.

It is preferred that the negative electrode 2 has a capacity equal to 1.0 to 2.5 times the sum of a nickel hydroxide capacity of the non-sinter type nickel positive electrode 1 and an amount of electricity required for oxidization of the cobalt monoxide. This is because an increase in the inner pressure will hardly be controlled at the early stage of a charge and discharge cycle operation if the capacity of the negative electrode is less than 1.0 time that of the positive electrode. Also, if the capacity of the negative electrode exceeds 2.5 times that of the positive electrode, the accommodating size of the positive electrode in a given volume of the enclosure will be reduced by an increase in the size of the negative electrode. Consequently, the higher energy storage will be no more expected and the use of a large amount of the hydrogen absorbing alloy powder which is costly will raise the production cost.

The synthetic resin nonwoven material for the separator 3 may be of polypropylene, polyamide, or a combination of polypropylene and polyamide. Preferably, the separator 3 is 50 to 100 $g/m^2$ in texture (weight per area) and 0.1 to 0.25 mm in thickness. The texture of the separator 3 should be specified because the amount of the alkali electrolyte which the separator 3 can contain will decrease if the texture of the separator 3 is less than 50 $g/m^2$ and as the result, the exhaustion of the alkali electrolyte will be accelerated during the charge and discharge operation thus causing the life of the cell to be reduced. Also, if the texture of the separator 3 exceeds 100 $g/m^2$, the volume of fabric in the separator 3 will increase. Accordingly, the space for holding the alkali electrolyte becomes smaller and the exhaustion of the electrolyte at the early stage of the charge and discharge operation will be involved. The thickness of the separator 3 should also be specified because if it is less than 0.1 mm, the risk of inner short-circuit will increase. If the thickness of the separator 3 exceeds 0.25 mm, the installation space of the positive electrode and negative electrode will be decreased by an increase in the size of the separator 3 thus preventing the higher storage of electricity.

The alkali electrolyte may be a mixture solution of sodium hydroxide (NaOH) and lithium hydroxide (LiOH), potassium hydroxide (KOH) and LiOH, or NaOH, KOH, and LiOH. The mixture of KOH and LiOH is most preferred.

The inner pressure during the over charging must not be increased, and the utilization of charging and discharging the electrode must be improved. To this end, it is desirable that the current supplied range from 0.05 to 1 CmA during the period between the start of current application and the time when the amount of electricity applied increases to 1.5 times or more of the electricity required to oxidize the cobalt monoxide contained in the non-sintered nickel cathode into cobalt oxy-hydroxide (CoOOH). 1 CmA represents a rate of current (mA) which allows the rated amount of electricity of a secondary cell to be charged for discharge in one hour. For example, the rated amount of electricity of a secondary cell can be charged for discharge in 20 hours at 0.05 CmA.

The current supplied at the initial charging of the secondary cell is limited to the value specified above, for the following reason. If the current is less than 0.05 CmA, the amount of electricity used cause the generating of gas, i.e., a reaction taking place simultaneously occurring with the discharging, will decrease. As a result of this, the cobalt monoxide contained in the non-sintered nickel cathode cannot be fully oxidized to cobalt oxy-hydroxide, making it difficult for the negative electrode to have a portion kept charged. Consequently, the cell cannot have good charge or over-discharge characteristic when supplied with a large current. On the other hand, if the current supplied at the initial charging of the secondary cell exceeds 1 CmA, both cobalt monoxide and nickel hydroxide are oxidized simultaneously. Hence, cobalt monoxide cannot be oxidized so efficiently as desired, and the negative electrode cannot has so large a charged portion. Consequently, the negative electrode is less chemically active than is required. As the result, the reduction for shift of oxygen gas generated at the positive electrode to water will be less effected at the over-charged area, causing an increase in the inner pressure.

The period at the initial charge of the secondary cell should be limited because if it is less than the foregoing period, the oxidization of the cobalt monoxide in the positive electrode for shift to cobalt oxy-hydroxide is unsatisfactorily carried out, thus rendering the negative electrode difficult to keep a part of the charged area.

Figure 1:
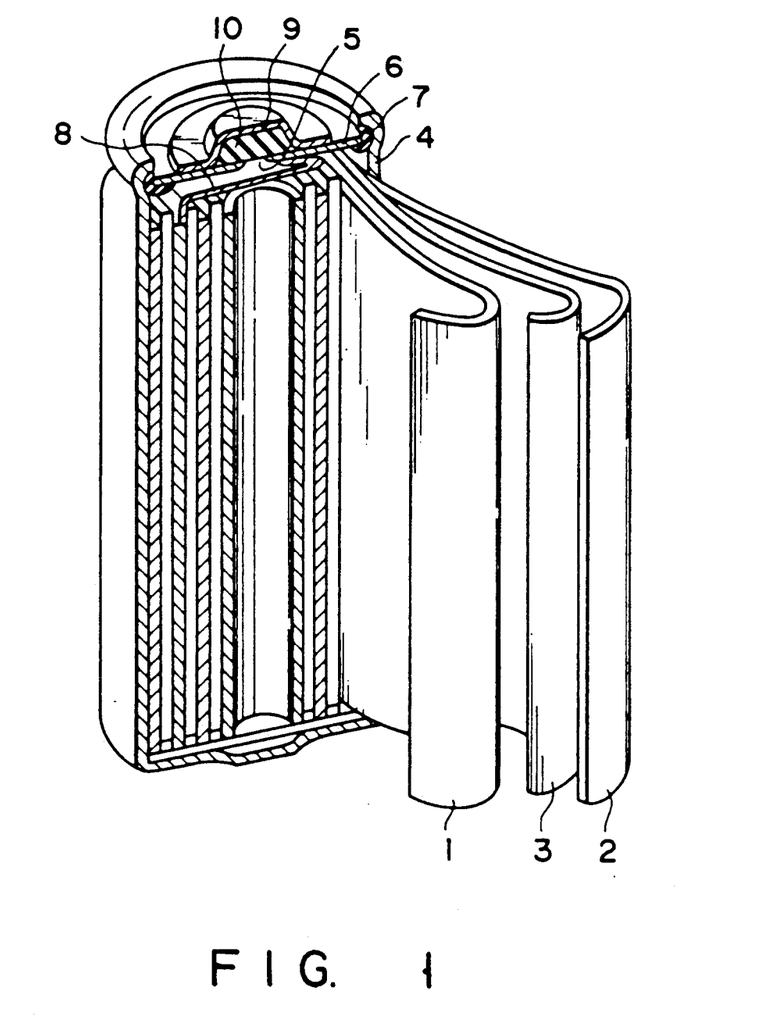
FIG. 1 is a partially explained perspective view of a nickel-metal hydride secondary cell according to the present invention.

As shown in FIG. 1, both the non-sinter type nickel positive electrode 1 and the hydrogen absorbing alloy negative electrode 2 spaced from each other by the separator 3 are arranged in the spiral form and accommodated within the bottomed cylindrical enclosure 4. However, another arrangement will be possible in which a plurality of non-sinter type nickel positive electrodes and a plurality of hydrogen absorbing alloy negative electrodes are alternately placed in layers while being spaced by separators respectively, all of which being installed in a cylindrical enclosure with a bottom.

Hence, a nickel-metal hydride secondary cell according to the present invention exhibits various better characteristics as described below.

(1) The non-sinter type nickel positive electrode is provided in which a conductive core is formed with a mixture of nickel hydroxide powder and cobalt monoxide powder of which surface is covered with a layer of high-valence cobalt oxide. Accordingly, the oxidization of the cobalt monoxide powder contained in the positive electrode which is exposed to the air before the initial charge can be prevented by the layer of the high-valence cobalt oxide. Also, the cobalt monoxide powder covered with the layer of the high-valence cobalt oxide has an improved property for stability of chemical characteristics storage as compared with non-covered cobalt monoxide powder. The utilization of the positive electrode associated with the inherent property of the cobalt monoxide is thus enhanced allowing the lift of the nickel-metal hydride secondary cell to be extended in the charge and discharge cycle operation.

The cobalt monoxide powder which is covered with the layer of the high-valence cobalt oxide is prevented from abrupt ignition during the quick oxidization and also, is stable in the air. It is thus feasible to fabricate the positive electrode under the normal atmosphere, without the use of specific gas of e.g. nitrogen.

Also, the cobalt monoxide powder is optimum utilized with the use of a non-sinter type nickel positive electrode containing 5 to 20% by weight of the cobalt monoxide powder covered with a layer of the highvalence cobalt oxide corresponding to the nickel hydroxide powder, thereby maintaining a sufficient amount of hydrogen (discharge reserve capacity) which is to be remained by the hydrogen absorbing alloy negative electrode at final stage of a discharge. Accordingly, the negative electrode can be controlled at the final stage of a discharge procedure and thus, the nickel-metal hydride secondary cell will be improved in the discharge characteristic (specifically, at high current).

(2) The hydrogen absorbing alloy negative electrode is provided in which a conductive core is has on it a layer mode of a mixture of hydrogen absorbing alloy powder and the conductive material. The conductive material is a powder of carbon black having a specific surface area of more than 700 m$^2$/g. Accordingly, the carbon black activates to enhance the electrical contact between hydrogen absorbing alloy powder and also, between the hydrogen absorbing alloy powder and the conductive core which serves as a collector. The negative electrode is thus reduced in the electrical resistance allowing a higher current to pass, so that the nickel-metal hydride secondary cell can be improved in the characteristics of charge and discharge at high current.

With the use of carbon black having a well arranged 3-dimensional chain structure made by secondary agglomeration of fine carbon particles (primary particles) of about 10 to 30 nm in diameter, the number of the carbon particles is increased in a given weight. Thus, the negative electrode can disperse a higher amount of the carbon particles, enhancing the electrical contact between the hydrogen absorbing alloy powder and between the hydrogen absorbing alloy powder and the conductive core. The 3-dimensional chain structure of the negative electrode is so constructed that the electrical contact between the hydrogen absorbing alloy powder and between the hydrogen absorbing alloy powder and the conductive core is made in the matrix arrangement. Accordingly, the negative electrode is considerably reduced in the electrical resistance allowing a higher current to pass. The nickel-metal hydride secondary cell will thus be improved in the characteristics of charge and discharge at higher current.

Due to the electrical conductivity of the carbon black, an effective use is made of the electrical activity of the hydrogen absorbing alloy powder contained in the negative electrode. Thus, the total surface area of the alloy powder, which is one of the factors determining the efficiency of the reactions (i.e., oxidation and reduction), is fairly large, and the polarization in the negative electrode is suppressed at the time of charging and discharging. As a result, not only can the large-current characteristic of the cell be improved, but also can the chemical reaction of gas be promoted during the over-charging and over-discharging. The carbon black in the negative electrode causes an electrochemical reaction on the periphery thereof. This also accelerates the speed of the gas reaction during the over-charge and over-discharge. Accordingly, the reaction of oxygen and hydrogen gas will be improved during the over-charge and over-discharge while an increase in the inner pressure is prevented, allowing the life of the nickel-metal hydride secondary cell to be prolonged in the charge and discharge.

(3) The hydrogen absorbing alloy negative electrode is provided of which capacity is 1.0 to 2.5 times the sum of a nickel hydroxide capacity of the non-sinter type nickel positive electrode and an amount of electricity required for oxidization of the cobalt monoxide powder. Accordingly, an increase in the inner pressure of the nickel-metal hydride secondary cell will be controlled at the early stage of a charge and discharge cycle operation.

More particularly, during the charge of the nickel-metal hydride secondary cell, the reaction in which the nickel hydroxide is shifted to nickel oxy-hydroxide is executed at the non-sinter type nickel positive electrode and simultaneously, at the hydrogen absorbing alloy negative electrode, hydrogen gas generated by the electrolysis of an alkali electrolyte is absorbed. Accordingly, no inner pressure increase will be caused. During the discharge of the nickel-metal hydride secondary cell, nickel oxy-hydroxide is reduced to nickel hydroxide at the positive electrode and absorbed hydrogen is oxidized at the negative electrode, thus ensuring no increase in the inner pressure. To produce no increase in the inner pressure and carry out smooth operation of charge and discharge, the hydrogen absorbing alloy negative electrode should be capable of absorbing the entire amount of hydrogen generated by electrolysis of the alkali electrolyte during the charge procedure.

In a known nickel-metal hydride secondary cell, the hydrogen absorbing alloy negative electrode is arranged to be equal to the nickel hydroxide in the non-sinter type nickel positive electrode in the respect of capacity. However, during the charge, a part of the cobalt monoxide is oxidized changing to cobalt oxy-hydroxide, as well as the nickel hydroxide in the positive electrode. The oxidization of the cobalt monoxide causes electrolysis of the alkali electrolyte in the enclosure containing the positive electrode and negative electrode and thus, a corresponding amount of hydrogen to an amount of electricity required for the oxidization is generated and will be absorbed by the negative electrode. The cobalt monoxide when having been oxidized to cobalt oxy-hydroxide is rarely reduced during the discharge. Hence, the hydrogen generated at the carry stage of the charge and discharge cycle operation when the cobalt monoxide is oxidized to cobalt oxy-hydroxide remains absorbed in the negative electrode. The hydrogen absorbing capacity of the negative electrode is hence decreased at the early stage of the charge and discharge cycle operation by an amount of hydrogen generated during the oxidization of the cobalt monoxide. As the result, when the capacity of the negative electrode is determined corresponding to the amount of hydrogen generated during the oxidization of the nickel hydroxide in the positive electrode, a part of the generated hydrogen is not absorbed by the negative electrode during the charge procedure and remains in the enclosure. This will cause a sharp increase in the inner pressure at the early stage of the charge and discharge cycle operation.

In view of the aforementioned aspect, the capacity of the hydrogen absorbing alloy negative electrode is set to 1.0 to 2.5 times the sum of the nickel hydroxide capacity of the non-sinter type nickel positive electrode and the amount of electricity require for oxidization of the cobalt monoxide. As the negative electrode is arranged to accept the surplus of hydrogen generated by oxidization of the cobalt monoxide, a nickel-metal hydride secondary cell is provided in which the inner pressure increase is prevented at the early stage of the charge and discharge cycle operation.

(4) The separator of synthetic resin unwoven material having a texture of 50 to 100 g/m$^2$ and a thickness of 0.1 to 0.25 mm is provided between the non-sinter type nickel positive electrode and the hydrogen absorbing alloy negative electrode, so that the exhaustion of alkali electrolyte in the separator can be prevented thus extending the life of the nickel-metal hydride secondary cell for the charge and discharge cycle operation.

More particularly, as the charge and discharge cycle procedure proceeds in the nickel-metal hydride secondary cell, the positive electrode contained in the enclosure becomes expanded to press against the separator. Thus, the alkali electrolyte in the separator will be reduced causing a result of exhaustion. With the use of a specific separator arranged for having a given size in texture and thickness, a desired amount of the alkali electrolyte can be retained. Accordingly, even if the positive electrode expands and presses against the separator during the charge and discharge cycle, the exhaustion of the alkali electrolyte in the separator will be prevented so that the life of the nickel-metal hydride secondary cell is increased for the charge and discharge cycle operation.

(5) When the nickel-metal hydride secondary cell is initially charged at a current of 0.05 to 1 CmA in which the separator is provided between the non-sinter nickel positive electrode and the hydrogen absorbing alloy negative electrode, all the components being accommodated in an enclosure, the cobalt monoxide in the positive electrode is oxidized to cobalt oxy-hydroxide and then, the nickel hydroxide is oxidized for shift to nickel oxy-hydroxide. The cobalt oxy-hydroxide generated during the initial charge procedure is rarely reduced during the discharge and maintained at a stable state. Also, the amount of electricity consumed during the oxidization activates for generation hydrogen at the negative electrode, whereby a charge area corresponding to the electricity will remain at the negative electrode. As the initial charge at such a rate of current is carried out during a period while 1.5 times the electricity associated with the oxidization of the cobalt monoxide to the cobalt oxy-hydroxide, most of all amount of the cobalt monoxide in the positive electrode is shifted to the cobalt oxy-hydroxide. Accordingly, the utilization of the positive electrode is increased thus ensuring a higher storage capacity of the nickel-metal hydride secondary cell. Additionally, the negative electrode remains a charged area therein so that the generation of gas during the discharge at a higher current can be prevented and thus, the nickel-metal hydride secondary cell will be improved in operational reliability.

Preferred embodiments of the present invention will be described referring to the accompanying drawings.

EXAMPLE 1

90 parts by weight of nickel hydroxide powder and 10 parts by weight of cobalt monoxide powder covered with a high-valence cobalt oxide, e.g. $Co_3O_4$ layer of 10% by weight were dry mixed with polytetrafluoroethylene (PTFE) and carboxymethylcellulose (CMC) and then, added with deionised water for preparing a paste. The paste was in turn applied to a nickel sintered fabric core for filling which was then dried, pressed and trimmed for producing a non-sinter type nickel positive electrode.

A 200-mesh passed powder of hydrogen absorbing alloy containing $LmNi_{4.2}Co_{0.2}Mn_{0.3}Al_{0.3}$ (Lm: La-rich misch metal) was added together with carbon black to a mixture of sodium polyacrylate, PTFE, and CMC which was then mixed up with the presence of deionised water for preparing a paste. The paste was applied to a punched metal which was in turn dried, pressed, and trimmed for fabricating a hydrogen absorbing alloy negative electrode.

The non-sinter type nickel positive electrode and the hydrogen absorbing alloy negative electrode which was separated by a separator of polypropylene nonwoven material was arranged in spiral form and placed within a cylindrical enclosure of steel having a bottom. The enclosure was then filled with an alkali electrolyte consisting of a solution mixture of 7N-KOH and 1N-LiOH, constituting a nickel-metal hydride secondary cell which has a theoretical capacity of 1000 mAh and is arranged as shown in FIG. 1. The theoretical capatity is a capacity which calculates from the amount of nickel hydroxide.

CONTROL 1

90 parts by weight of nickel hydroxide powder and 10 parts by weight of $Co_3O_4$ powder were dry mixed with PTFE and CMC and then, added with deionised water for preparing a paste. The paste was in turn applied to a nickel sintered fabric core for filling which was then dried, pressed, and trimmed for producing a non-sinter type nickel positive electrode. The produced positive electrode was combined with a hydrogen absorbing alloy negative electrode made in the same manner as of Example 1, constituting a nickel-metal hydride secondary cell having the same structure and the same theoretical capacity as the cell shown in FIG. 1.

CONTROL 2

90 parts by weight of nickel hydroxide powder and 10 parts by weight of active non-coated cobalt monoxide powder were dry mixed with PTFE and CMC and then, added with deionised water for preparing a paste. The paste was in turn applied to a nickel sintered fabric core for filling which was then dried, pressed, and trimmed for producing a non-sinter type nickel positive electrode. The produced positive electrode was combined with the hydrogen absorbing alloy negative electrode made in the same manner as of Example 1, constituting a nickel-metal hydride secondary cell having the same structure and the same theoretical capacity as the cell shown in FIG. 1.

CONTROL 3

90 parts by weight of nickel hydroxide powder and 10 parts by weight of active cobalt hydroxide powder were dry mixed with PTFE and CMC and then, added with deionised water for preparing a paste. The paste was in turn applied to a nickel sintered fabric core for filling which was then dried, pressed, and trimmed for producing a non-sinter type nickel positive electrode. The produced positive electrode was combined with the hydrogen absorbing alloy negative electrode made in the same manner as of Example 1, constituting a nickel-metal hydride secondary cell having the same structure and the same theoretical capacity as the cell shown in FIG. 1.

The nickel-metal hydride secondary cells prepared in Example 1, and Controls 1 to 3 were left in the room temperature for 24 hours for sufficient penetration of the alkali electrolyte into the separators. Then, each of the nickel-metal hydride secondary cells was charged at 0.2 CmA to 150g the theoretical capacity of the positive electrode and fully discharged at 0.2 gmA. This cycle procedure was repeated ten times and the utilization of each positive electrode was calculated. The resultant measurements are shown in FIG. 2.

Figure 2:
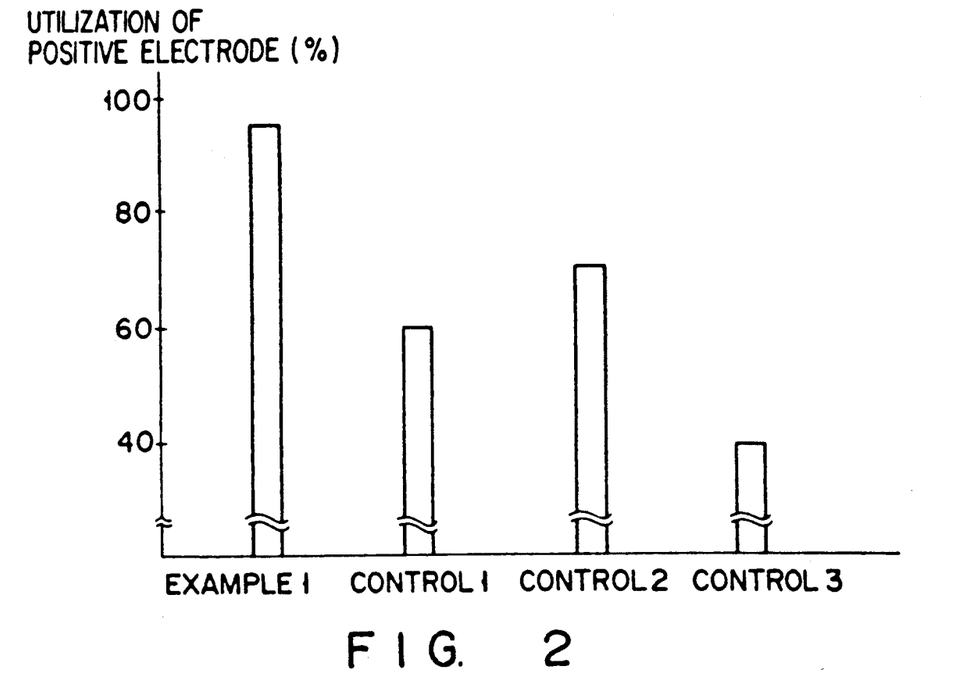
FIG. 2 is a characteristic diagram showing the utilization of a positive electrode in a nickel-metal hydride secondary cell associated with Example 1 and Controls 1 to 3.

As apparent from FIG. 2, the secondary cell of Example 1 provided with the non-sinter type nickel positive electrode containing the cobalt monoxide powder coated with the $Co_3O_4$ layer exhibits 95g of the utilization while the cells of Controls 1 to 3 provided with the non-sinter type nickel positive electrodes containing the $Co_3O_4$ powder, the active non-coated cobalt monoxide powder, and the cobalt hydroxide powder show 60g, 70g, and 40g of the utilization respectively. Particularly, it is assumed that the utilization of the non-sinter type nickel positive electrode of Control 2 containing the active non-coated cobalt monoxide powder decreases to 70g because the cobalt monoxide powder abruptly reacts with oxygen in the air and is oxidized deep into powder thereof thus failing to carry out its inherent task of increasing the utilization of the positive electrode.

EXAMPLE 2

Mixtures of 90 parts by weight of nickel hydroxide powder and 10 parts by weight of cobalt monoxide powder coated with layers of 0.1g, 10g, 20g, and 40% by weight of high-valence cobalt oxide, e.g. $Co_3O_4$ respectively were dry mixed with PTFE and CMC and then, added with deionised water for preparing four different types of paste. The four pastes were in turn applied to nickel sintered fabric cores respectively which were then dried, pressed, and trimmed for producing four different non-sinter type nickel positive electrodes. Each of the four different positive electrodes was then assembled with the hydrogen absorbing alloy negative electrode, the separator, and the bottomed cylindrical enclosure filled with the alkali electrolyte which all had been fabricated in the same manner as of Example 1, constituting a nickel-metal hydride secondary cell of 1000 mAh in a theoretical capacity having an arrangement similar to that shown in FIG. 1.

All the four nickel-metal hydride secondary cells prepared in Example 2 were left in the room temperature for 24 hours for sufficient penetration of the alkali electrolyte into the separators. Then, each of the four nickel-metal hydride secondary cells was charged at 0.2 CmA to 150g the theoretical capacity of the positive electrode and fully discharged at 0.2 CmA. This cycle procedure was repeated ten times and the utilization of each positive electrode was calculated. The resultant measurements are shown in FIG. 3.

Figure 3:
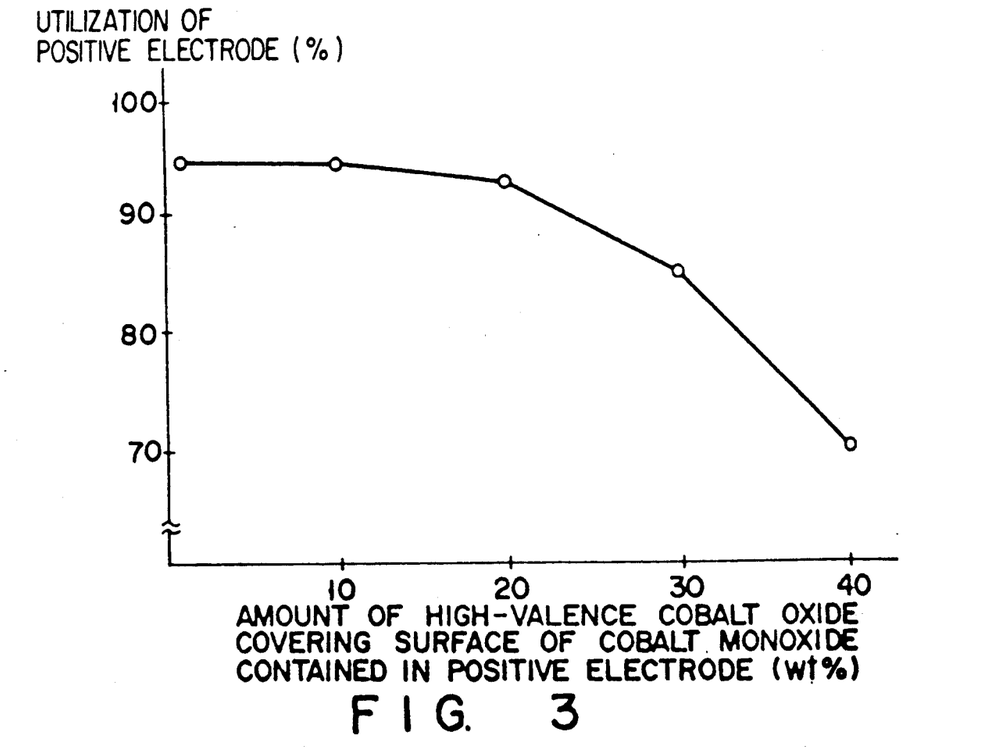
FIG. 3 is a characteristic diagram showing the relation between the utilization of a positive electrode and the amount of a high-valence cobalt oxide covering the surface of cobalt monoxide contained in the positive electrode of a nickel-metal hydride secondary cell associated with Example 2.

As apparent from FIG. 3, the secondary cell provided with the non-sinter type nickel positive electrode containing the cobalt monoxide powder coated with more than 20% by weight of the high-valence cobalt oxide, e.g. $Co_3O_4$ exhibits a gradual reduction in the utilization. It is then understood that the amount of $Co_3O_4$ coating is preferably not more than 20% by weight in the respect of utilization.

EXAMPLES 3 to 5

90 parts by weight of nickel hydroxide powder and 10 parts by weight of cobalt monoxide powder covered with a $Co_3O_4$ layer of 10% by weight were dry mixed with PTFE and CMC and then, added with deionised water for preparing a paste. The paste was in turn applied to a nickel sintered fabric core for filling which was then dried, pressed, and trimmed for producing a non-sinter type nickel positive electrode.

Also, mixtures of 100 parts by weight of hydrogen absorbing alloy powder similar to that of Example 1 and 1 part by weight of furnace black which are 700, 800 and 1200 $m^2/g$ in specific surface area respectively were added with sodium polyacrylate, PTFE, and CMC and then, mixed up with the presence of deionised water for preparing three different types of paste, using a mixer (s). The three different types of paste were applied to punched metal sheets respectively which were in turn dried, pressed, and trimmed for fabricating three different hydrogen absorbing alloy negative electrodes.

Figure 4:
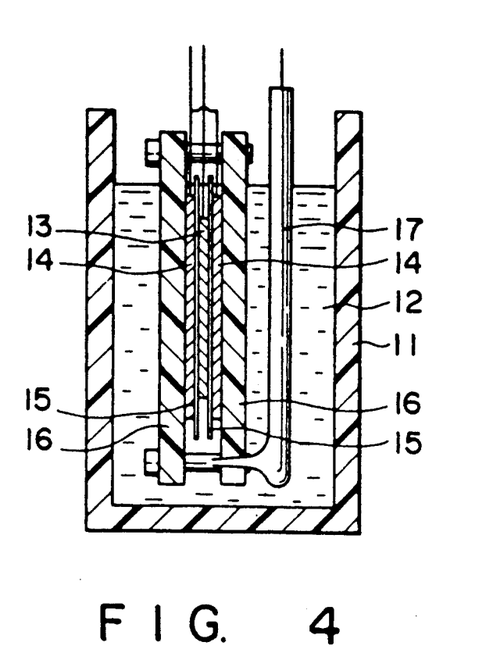
FIG. 4 is a cross sectional view of a test cell employed in Examples of the present invention.

Three negative electrodes were combined, each with the positive electrode, constituting a test cell, as illustrated in FIG. 4, in which a square tubular enclosure 11 having a bottom is filled with an alkali electrolyte 12 consisting of an 8N-KOH solution. As shown, the hydrogen absorbing alloy negative electrode 13 is sandwiched by a pair of the non-sinter type nickel positive electrodes 14 and separated from the same by separators 15 made of polypropylene unwoven material. The negative electrode 13, the positive electrodes 14, and the separators 15 all are disposed within the enclosure 11. A couple of holder plates 16 made of insulating material are provided on the outer sides of the positive electrodes 14 respectively for retaining the negative electrode 13, the positive electrodes, 14, and the separators 15 from the outward. Also, a reference electrode 17 is provided in the enclosure 11.

Figure 5:
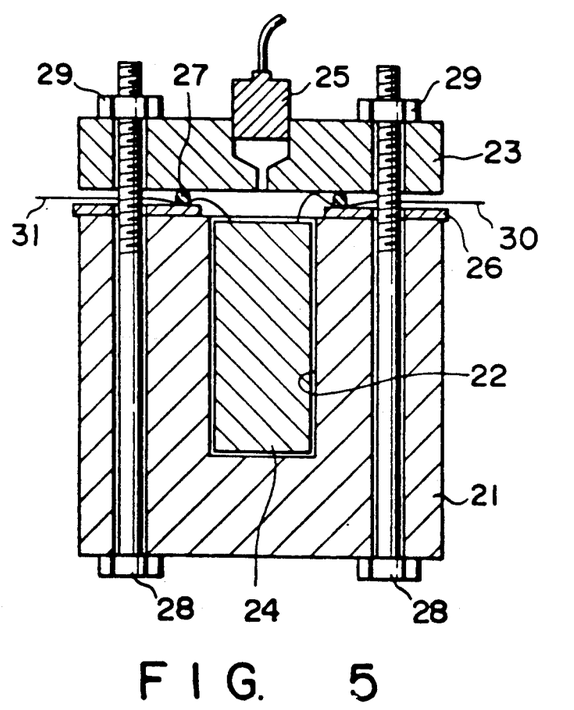
FIG. 5 is a cross sectional view of an AA-size test cell employed in Examples of the present invention.

Separately, three negative electrodes were combined, each with the positive electrode, constituting an AA-size test cell, as illustrated in FIG. 5. As illustrated in FIG. 5, an acrylic resin cell body 21 incorporates a space 22 formed at the center thereof and having a size equal to that of a known AA-size cell in inner diameter and height. A cap 23 which serves as a closing plate is provided covering the opening of the cell body 21. An electrode unit 24 made by arranging the non-sinter type nickel positive electrode and the hydrogen absorbing alloy negative electrode separated by a separator in spiral form is accommodated in the space 22 of the cell body 21. A pressure detector 25 for monitoring the pressure in the cell is mounted to the cap 23. The space 22 accommodating the electrode unit 24 is filled with 2.4 ml of an alkali electrolyte consisting of an 8N-KOH solution and sealed air tightly with the cap 23 using a rubber sheet 26 and an O-ring 27 placed between the cell body 21 and the cap 23 which are securely coupled to each other by bolts 28 and nuts 29. The non-sinter type nickel positive electrode of the electrode unit 24 is connected to a positive electrode lead wire 30 while the hydrogen absorbing alloy negative electrode of the same is connected to a negative electrode lead wire 31. Both the lead wires 30 and 31 extend outwardly from between the rubber sheet 26 and the O-ring 27.

CONTROL 4

100 parts by weight of hydrogen absorbing alloy powder similar to that of Example 1 and 1 part by weight of acetylene black having a specific surface area of 80 $m^2/g$ were added with sodium polyacrylate, PTFE, and CMC and then mixed up with the presence of deionised water for preparing a paste, using a mixer. The paste was applied to a punched metal which was in turn dried, pressed, and trimmed for fabricating a hydrogen absorbing alloy negative electrode. The negative electrode was combined with a positive electrode made in the same manner as of Example 3, constituting a test cell having the same structure and the same theoretical capacity as the cell shown in FIG. 4.

Separately, the negative electrode was combined with a positive electrode made in the same manner as of Example 3, constituting an AA-size test cell having the same structure and the same theoretical capacity as the cell shown in FIG. 5.

CONTROL 5

100 parts by weight of hydrogen absorbing alloy powder similar to that of Example 1 and 1 part by weight of graphite having a specific surface area of 5 $m^2/g$ were added with sodium polyacrylate, PTFE, and CMC and then mixed up with the presence of deionised water for preparing a paste, using a mixer. The paste was applied to a punched metal which was in turn dried, pressed, and trimmed for fabricating a hydrogen absorbing alloy negative electrode. The negative electrode was combined with a positive electrode made in the same manner as of Example 3, constituting a test cell having the same structure and the same theoretical capacity as the cell shown in FIG. 4.

Separately, the negative electrode was combined with a positive electrode made in the same manner as of Example 3, constituting an AA-size test cell having the same structure and the same theoretical capacity as the cell shown in FIG. 5.

Each of the test cells of Examples 3 to 5 and Controls 4 and 5 having a structure illustrated in FIG. 4 was then charged at a current of 150 mA per 1 g of the hydrogen absorbing alloy powder contained in the hydrogen absorbing alloy negative electrode and discharged. This cycle procedure was repeated ten times. Then, a voltage of the negative electrode at the discharge at the tenth cycle was measured with relation to the reference electrode. The resultant measurements are shown in FIG. 6.

Figure 6:
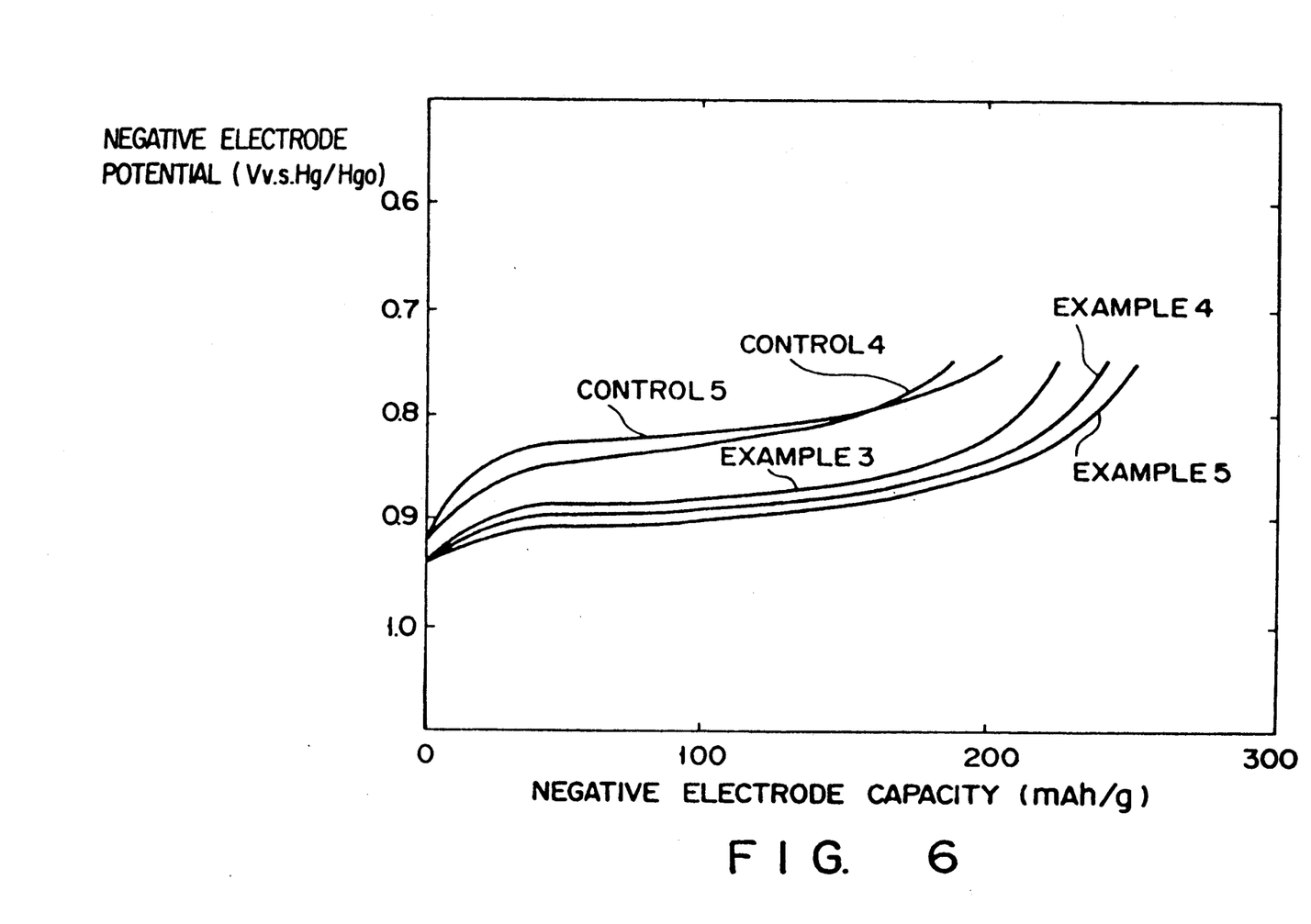
FIG. 6 is a characteristic diagram showing the relation of potential to capacity at the negative electrode of a test cell measured in Examples 3 to 5 and Controls 4 and 5.

As apparent from FIG. 6, the test cells of Examples 3 to 5 provided with the hydrogen absorbing alloy negative electrodes containing the furnace black of more than 700 $m^2/g$ in specific surface area are much better in the negative electrode potential and more increased in the capacity than the test cells of Controls 4 and 5 provided with the hydrogen absorbing alloy negative electrodes containing acetylene black and graphite respectively.

The AA-size cells of Examples 3 to 5 and Controls 4 and 5 having a structure shown in FIG. 5 were initially charged at 100 mA for 15 hours and discharged at 1 A to 0.8 V. Then, they were recharged at 1 A for 1.5 hours and discharged at 1 A to 0.8 A. This cycle procedure was repeated 30 times. After the 30th, an over-discharge test was carried out and a change in the inner pressure of each cell with time was measured using a pressure detector installed in the cell. The resultant measurements are shown stalled in the cell. The resultant measurements are shown in FIG. 7.

Figure 7:
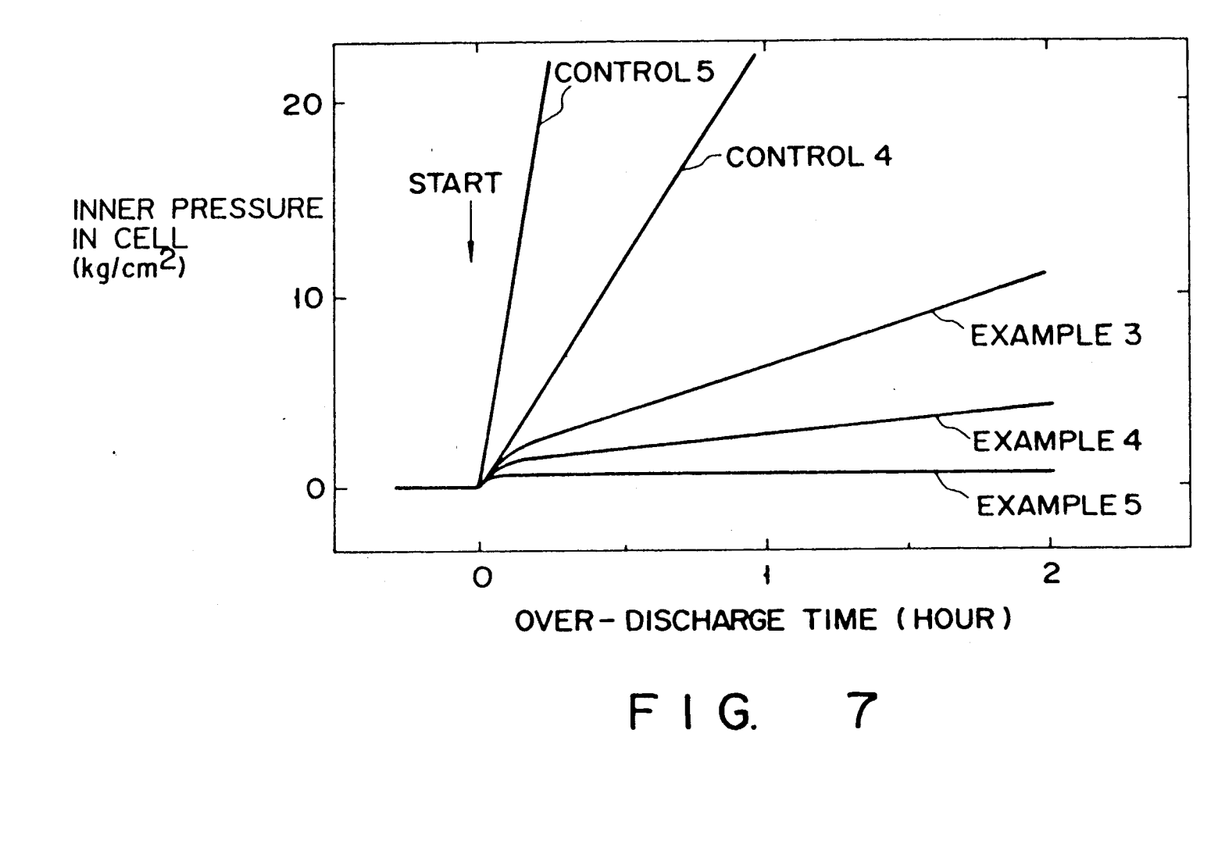
FIG. 7 is a characteristic diagram showing the relation of the inner pressure in an AA-size test cell to over-discharge time measured in Examples 3 to 5 and Controls 4 and 5.

As apparent from FIG. 7, the hydrogen absorbing alloy negative electrodes of the AA-size test cells of Examples 3 to 5 containing the furnace black of more then 700 $m^2/g$ in specific surface area are more improved in the hydrogen gas reaction during over-discharge than the negative electrodes of the test cells of Controls 4 and 5, thus preventing an increase in the inner pressure.

EXAMPLES 6 to 11

Mixtures of 100 parts by weight of hydrogen absorbing alloy powder similar to that of Example 1 and 0.05, 0.1, 1, 2, 4 and 5 parts by weight of furnace black having a specific surface area of 800 m²/g respectively were added with PTFE and CMC and then, mixed under the presence of deionised water by a mixer(s) for preparing 6 different types of paste. The 6 different types of paste were applied to punched metal members which were in turn dried, pressed, and trimmed for producing 6 different hydrogen absorbing ally negative electrodes. Six hydrogen absorbing alloy negative electrodes were combined, each with a positive electrode made in the same manner as of Example 3, constituting 6 different types of nickel-metal hydride secondary cells having the same structure and the same theoretical capacity as the cell shown in FIG. 1.

The nickel-metal hydride secondary cells prepared in preparing 5 different hydrogen absorbing alloy negative electrodes. A capacity of each negative electrodes is shown in Table 1. Table 1 also indicates capacity ratios of negative electrode/positive electrode.

Five negative electrodes were combined, each with the positive electrodes respectively, constituting 5 different types of nickel-metal hydride secondary cells having the same structure and the same theoretical capacity as the cell shown in FIG. 1.

The nickel-metal hydride secondary cells of Examples 12 to 14 and Controls 6 and 7 were repeatedly charged at 0.3 CmA to 150g and discharged at 1 CmA. The amount of discharge during the discharge was measured until the discharge voltage was decreased to less than 1 V. Also, the number of charge and discharged cycle procedures was counted until the discharge decreased to less than 80g the amount at the second cycle procedure. The resultant measurements are shown in Table 2.

TABLE 1

|  | $Ni(OH)_2$ capacity positive electrode (mAh) | CoO capacity in positive electrode (mAh) | Capacity of negative electrode (mAh) | Capacity ratio of negative electrode/ positive electrode |
|---|---|---|---|---|
| Example 12 | 1044 | 129.1 | 1293 | 1.102 |
| Example 13 | 1036 | 128.2 | 1984 | 1.704 |
| Example 14 | 1051 | 130.0 | 2929 | 2.480 |
| Control 6 | 1035 | 128.1 | 993 | 0.854 |
| Control 7 | 1012 | 125.2 | 1120 | 0.935 |

Figure 8:
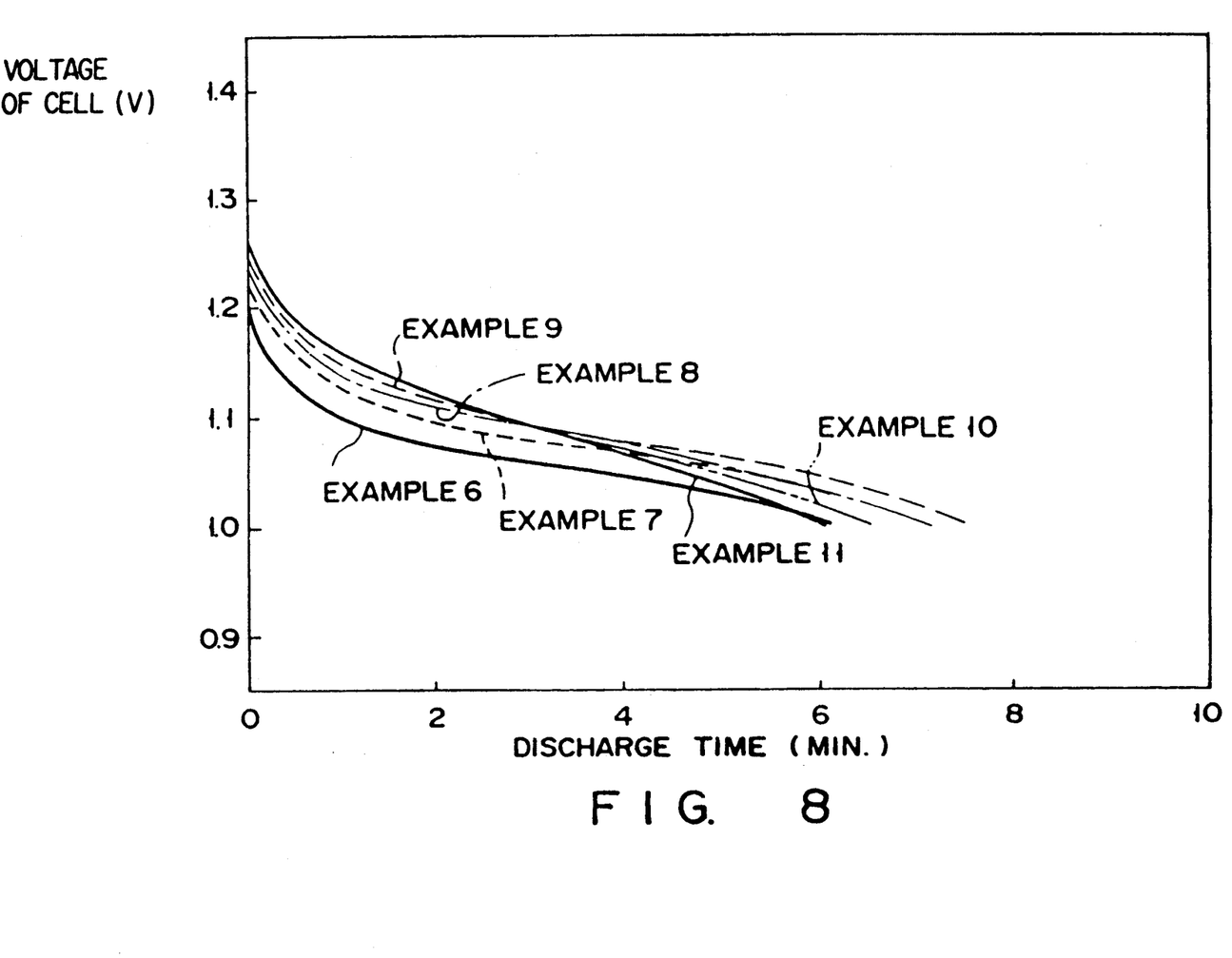
FIG. 8 is a characteristic diagram showing the relation of the voltage of a nickel-metal hydride secondary cell to a discharge time associated with Examples 6 to 11.

Examples 6 to 11 were initially charged at 100 mA for 15 hours and discharged at 1 A to 0.8 V. Then, the cells were recharged at 1 A for 1.5 hours and discharged at 1 A to 0.8 V. This cycle procedure was repeated 30 times. At the 30th, the characteristics during discharge at 5 A were examined. The resultant measurements are shown in FIG. 8. Each interval between the recharge and the discharge was held open for 30 minutes.

As apparent from FIG. 8, the secondary cells of Examples 7 to 10 provided with the hydrogen absorbing alloy negative electrode containing more than 0.1 parts by weight of the furnace black of more than 700 m²/g in specific surface area are highly improved in the discharge characteristics. However, the cell of Example 11 provided with the hydrogen absorbing alloy negative electrode containing more than 4 parts by weight of the furnace black permits a less amount of the hydrogen absorbing alloy powder in a given volume to be present, lowering the capacity.

EXAMPLES 12 to 14 AND CONTROLS 6 and 7

Different mixtures of nickel hydroxide powder and cobalt monoxide powder covered with a $Co_3O_4$ layer of 10% by weight were mixed with sodium polyacrylate, CMC, and PTFE under the presence of deionised water for preparing 5 different types of paste. The different types of paste were applied to nickel sintered fabric cores which were in turn dried, pressed, and trimmed for producing 5 different non-sinter type nickel positive electrodes. Nickel hydroxide ($Ni(OH)_2$) capacity and cobalt monoxide (CoO) capacity in each of the positive electrodes are shown in Table 1.

Separately, different mixtures of hydrogen absorbing alloy powder similar to that of Example 1 and carbon black were mixed with sodium polyacrylate, PTFE and CMC by mixers under the presence of deionised water for preparing 5 different types of paste. The 5 different types of paste were then applied to punched metal members which were in turn dried, pressed, and trimmed for

TABLE 2

|  | Number of cycles (time) |
|---|---|
| Example 12 | 590 |
| Example 13 | 801 |
| Example 14 | 989 |
| Control 6 | 58 |
| Control 7 | 271 |

As apparent from Table 2, the nickel-metal hydride secondary cells of Examples 12 to 14 provided with the hydrogen absorbing alloy negative electrodes having a capacity equal to 1.0 to 2.5 times the sum of the nickel hydroxide capacity of the positive electrode and the electricity needed for oxidization of the cobalt monoxide are improved in the operative life, lasting more than 500 cycles. Particularly, the life of the cells of Example 13 and 14 are highly increased ensuring over 800 cycles of charge and discharge operation. The nickel-metal hydride secondary cells of Controls 6 and 7 exhibiting less than 1.0 of the negative electrode/ positive electrode capacity ratio were however decreased in the discharge capacity at the early stage of the charge and discharge cycle procedure and a leakage of the electrolyte was found around the safety valve mounted to the closing plate and the positive electrode terminal. It is assumed that a decrease in the discharge capacity of the cell detected in Controls 6 and 7 was caused by the exhaustion of the electrolyte resulting from the leakage caused by an increase in the cell inner pressure.

EXAMPLES 15 to 20

Different mixtures of nickel hydroxide powder and cobalt monoxide powder covered with a $Co_3O_4$ layer of 10% by weight were mixed with sodium polyacrylate, CMC, and PTFE under the presence of deionised water for preparing 6 different types of paste. The 6 different types of paste were then applied to nickel sintered fabric cores which were in turn dried, pressed, and trimmed for producing 6 different non-sinter type nickel positive electrodes. Nickel hydroxide (Ni(OH)$_2$) capacity and cobalt monoxide (CoO) capacity in each of the positive electrodes are Table 3 also indicates amounts of CoO contained.

Separately, different mixtures of hydrogen absorbing alloy powder similar to that of Example 11 and carbon black were mixed with PTFE by mixers under the presence of deionised water for preparing 6 different types of paste. The 6 different types of paste were then applied to punched metal members which were in turn dried, pressed, and trimmed for preparing 6 different hydrogen absorbing alloy negative electrodes. A capacity of each negative electrodes is shown in Table 3. Table 3 also indicates capacity ratios of negative electrode/positive electrode.

Six positive electrodes were combined with the six negative electrodes respectively, constituting 6 different types of nickel-metal hydride secondary cells having the same structure and the same theoretical capacity as the cell shown in FIG. 1.

The nickel-metal hydride secondary cells of Examples 15 to 20 were repeatedly charged and discharged 20 times for run-in operation. The amount of discharge during the 1 CmA discharge was measured until the discharge voltage was decreased to less then 1 V. Also, the same during the 5 CmA discharge was measured until the discharge voltage was declined to less than 1 V. The relation between the 1 CmA and 5 CmA discharge capacities is shown in Table 4.

Example 16 was however accounted less consistent in practice but displayed an acceptable degree of the discharge characteristic at higher current as well as the cells of Examples 17 to 20.

EXAMPLE 21

90 parts by weight of nickel hydroxide powder and 10 parts by weight of cobalt monoxide powder covered with a Co$_3$O$_4$ layer of 10% by weight were dry mixed with sodium polyacrylate and CMC and added with PTFE and deionised water for preparing a paste. The paste was then applied to a nickel sintered fabric core which was in turn dried, pressed, and trimmed for producing a non-sinter type nickel positive electrode.

Separately, 200-mesh passed powder of hydrogen absorbing alloy similar to that of Example 1 and an amount of carbon black were added to sodium polyacrylate, PTFE, and CMC and mixed together with the presence of deionised water for preparing a paste. The paste was then applied to a punched metal which was in turn dried, pressed, and trimmed for producing a hydrogen absorbing alloy negative electrode.

Also, 42 different types of separators were prepared of polypropylene fiber nonwoven material, in the combination of a texture size of 25, 50, 75, 100, 125 and 150 g/m$^2$ and a thickness of 0.05, 0.10, 0.15, 0.20, 0.25, 0.30 and 0.35 mm, as each shown in Table 5.

The non-sinter type nickel positive electrode and the hydrogen absorbing alloy negative electrode, separated by each of the 42 different separators of polypropylene nonwoven material, were arranged in spiral form and

TABLE 3

|  | Ni(OH)$_2$ capacity in positive electrode (mAh) | CoO capacity in positive electrode (mAh) | Capacity of negative electrode | Capacity ratio negative electrode/ positive electrode | Amount of CoO in positive electrode (parts by weight) |
|---|---|---|---|---|---|
| Example 15 | 1022 | 22.7 | 2109 | 2.019 | 2 |
| Example 16 | 1045 | 58.2 | 2188 | 1.983 | 5 |
| Example 17 | 1021 | 113.6 | 2270 | 2.001 | 10 |
| Example 18 | 1006 | 168.0 | 2338 | 1.991 | 15 |
| Example 19 | 998 | 222.2 | 2506 | 2.054 | 20 |
| Example 20 | 870 | 290.5 | 2397 | 2.065 | 30 |

*The amount of CoO contained in the positive electrodes is corresponded to 100 parts by weight of Ni(OH)$_2$ in the positive electrode.

TABLE 4

|  | 5 CmA discharge capacity/ 1 CmA discharge capacity (%) |
|---|---|
| Example 15 | 43 |
| Example 16 | 72 |
| Example 17 | 77 |
| Example 18 | 79 |
| Example 19 | 80 |
| Example 20 | 80 |

As apparent from Table 4, the secondary cell of Example 15 is decreased in the discharge capacity during the 5 CmA discharge. It is assumed that this is caused by the inter-relation between a decrease in the discharge characteristics at higher current of the non-sinter type nickel positive electrode and a decrease in the effectiveness of the hydrogen absorbing alloy negative electrode which suffers from a shortage of absorbed hydrogen at the final stage of discharge procedure while a less amount of the cobalt monoxide has been applied. The secondary cells of Examples 16 to 20 exhibited no decrease in the discharge capacity during the 5 CmA discharge and was actuated satisfactorily. The cell of placed in a cylindrical enclosure made of steel having a bottom and filled with an alkali electrolyte consisting of a mixture solution of 7N-KOH and 1H-LiOH, so that 42 different types of nickel-metal hydride secondary cells, each providing a theoretical capacity of 1000 mAh and having an arrangement similar to that shown in FIG. 1, were fabricated.

Each of the nickel-metal hydride secondary cells of Example 21 was charged at 1 CmA to 150g the cell capacity and discharged at 1 CmA until the discharge voltage decreased to 0.8 V. This cycle procedure was repeated and the number of the cycle procedures was counted until the discharge capacity decreased to 50g the initial discharge capacity. The resultant measurements are shown in Table 5.

TABLE 5

| Texture size of separator (g/m$^2$) | (in number of cycles) Thickness of separator (mm) | | | | | | |
|---|---|---|---|---|---|---|---|
|  | 0.05 | 0.10 | 0.15 | 0.20 | 0.25 | 0.30 | 0.35 |
| 25 | — | 216 | 179 | 210 | 214 | 199 | 181 |
| 50 | — | 1120 | 1041 | 911 | 580 | 155 | 130 |
| 75 | — | 933 | 1452 | 1210 | 789 | 142 | 90 |

TABLE 5-continued

| Texture size of separator | (in number of cycles) Thickness of separator (mm) | | | | | | |
|---|---|---|---|---|---|---|---|
| (g/m²) | 0.05 | 0.10 | 0.15 | 0.20 | 0.25 | 0.30 | 0.35 |
| 100 | 160 | 510 | 692 | 1351 | 931 | 295 | 43 |
| 125 | 46 | 80 | 269 | 189 | 140 | 69 | 31 |
| 150 | 31 | 70 | 161 | 151 | 120 | 46 | 25 |

As apparent from Table 5, the secondary cells provided with the separators consisting of the polypropylene fiber unwoven material of 50 to 100 g/m² in texture size and 0.1 to 0.25 mm in thickness are increased in the operative life, lasting more than 500 cycles of charge and discharge operation which is more or less equivalent to the operative life of a known nickel-cadmium secondary cell. The secondary cells provided with the separators consisting of the polypropylene fiber nonwoven material of 0.05 mm in thickness and 25, 50, and 75 g/m² in texture size respectively exhibited signs of inner short-circuit during the forming of the positive electrode and negative electrode separated by the separator into a spiral arrangement and no charge and discharge cycle test was conducted. The secondary cell provided with the separator consisting of the polypropylene of 0.3 mm in thickness developed a leakage of the electrolyte from the safety valve mounted between a positive electrode terminal and a closing plate thus causing a drop in the discharge voltage. It is assumed that the leakage resulted from an increased in the inner pressure resulting from a reduction in the gas permeability of the separator which has a considerable thickness.

EXAMPLE 22

90 parts by weight of nickel hydroxide powder and 10 parts by weight of cobalt monoxide covered with a $Co_3O_4$ layer of 10% by weight were dry mixed with soduim polyacrylate, CMC and PTFE and added with deionised water for preparing a paste. The paste was then applied to a nickel sintered fabric core which was in turn dried, pressed, and trimmed for producing a non-sinter type nickel positive electrode.

Separately, a 200-mesh passed powder of hydrogen absorbing alloy similar to that of Example 1 and an amount of carbon black were added to sodium polyacrylate, PTFE, and CMC and mixed together with the presence of water for preparing a paste. The paste was then applied to a punched metal which was in turn dried, pressed, and trimmed for producing a hydrogen absorbing alloy negative electrode.

The positive electrode was combined with the negative electrode, constituting an AA-size test cell having the same structure and the same theoretical capacity as the cell shown in FIG. 5.

The test cell was left at a temperature of 45° C. for 24 hours and thereafter, initially charged at various rates of current listed in Table 6 up to 150g its capacity. Then, the test cell was examined for 1) inner pressure consistence during the initial charge, 2) the remaining capacity of the hydrogen absorbing alloy negative electrode, 3) the life for cycle operation, and 4) inner pressure behavior during the over-discharge. The resultant measurements are shown in Table 6.

The remaining capacity of the cell after the initial charge was measured from the amount of electricity in a charged state remaining partially at the negative electrode without discharge or more particularly, the ratio of the remaining amount of charged electricity to the total capacity of the negative electrode, after the cell discharged at a current of 1 CmA to 0.8 V was disassembled.

The life of the cell was measured by repeating a procedure of charging at 1 CmA to 150g the cell capacity and discharging at 1 CmA to 0.8 V. Each interval of 30 minutes was given between the charge and the discharge and the discharge and the recharge.

The inner pressure behavior during the over-discharge was examined by repeating the aforementioned procedure on 100 of the test cells, in which after the 30th procedure, the discharge was conducted at 0.2 CmA and while less than 0 v was detected (full discharge), the occurrence of inner pressure change was monitored during the over-discharge procedure in which 100g of the cell capacity was compulsory discharge.

The result, "good" for the inner pressure behavior during the initial charge shown in Table 6 indicates that the inner pressure of the test cell was less then 15 kgf/cm² which is equal to the operative pressure of the safety valve. The term, "not good" means that the inner pressure reached 15 kgf/cm² The "good" for the inner pressure behavior during the over-discharge indicates that the inner pressure was less than 15 kgf/cm² on all the 100 test cells. The term, "fairly good" means that the inner pressure reached 15 kgf/cm² on about a half of the 100 test cells. The "not good" means that the inner pressure reached 15 kgf/cm² on all the 100 test cells.

TABLE 6

| | No. 1 | No. 2 | No. 3 | No. 4 | No. 5 | No. 6 | No. 7 | No. 8 |
|---|---|---|---|---|---|---|---|---|
| Current during initial charge (CmA) | 0.01 | 0.05 | 0.1 | 0.3 | 0.5 | 1.0 | 1.2 | 1.5 |
| Inner pressure behavior during initial charge | Good | Good | Good | Good | Good | Good | Not good | Not good |
| Remaining capacity of negative electrode (%) | 5 | 9 | 10 | 10 | 10 | 10 | 7 | 5 |
| Operative life (number of cycles) | 100 | 300 | 300 | 300 | 300 | 300 | 50 | 30 |
| Inner pressure behavior during over-discharge | Not good | Good | Good | Good | Good | Good | Fairly good | Not good |

As apparent from Table 6, the test cells of No. 2, No. 3, No. 4 and No. 5 are improved in which the cobalt monoxide in the positive electrode was fully oxidized during the initial charge whereby the capacity factor of the positive electrode was increased. Also, a charged area was developed in the hydrogen absorbing alloy negative electrode during the initial charge thus enhancing the characteristic of over-discharge. The test cells of No. 1 and No. 8 exhibit in which the cobalt monoxide in the positive electrode was not appropriately oxidized during the initial charge thus lowering the utilization of the positive electrode. A charged area developed in the hydrogen absorbing alloy negative electrode during the initial charge was less extended, whereby an increase in the inner pressure was be caused during over-discharge. The test cell of No. 7 is improved more or less in the over-discharge characteristics but fails to provide a satisfactory level of the cell property for practical operation.

EXAMPLE 23

Test cells (theoretical capacity: 1000 mAh), each having the same structure as Example 22, were left to stand at 45° C. for 24 hours. Then, they were subjected to initial charging under the conditions shown in Table 7. After the negative electrodes of the cells had been completely discharged, the remaining capacity of each cell was measured. The results were as is shown in Table 7. The electricity consumed to oxidize the cobalt monoxide contained in the positive electrode of each cell into cobalt oxy-hydroxide was 10%.

TABLE 7

|  |  | No. 9 | No. 10 | No. 11 | No. 12 | No. 13 | No. 14 |
|---|---|---|---|---|---|---|---|
| Initial charge (%) | Current 0.1 CmA, | 5 | 10 | 15 | 30 | 150 | 15 |
|  | Current 2 CmA, | 0 | 0 | 0 | 0 | 0 | 135 |
| Remaining capacity of negative electrode (%) |  | 3 | 7 | 10 | 10 | 10 | 10 |

As apparent from Table 7, the test cells of No. 9 and No. 10 allowed the cobalt monoxide in the positive electrode to be less oxidized due to a small amount of initial charge (resulting from a short period of charging time) whereby an amount of a remaining capacity area to be generated at the hydrogen absorbing alloy negative electrode was reduced. Hence, the operative life is as short as that of the No. 1 test cell shown in Table 6, and the over-charge characteristics decreases. The test cells of No. 11 to No. 13 are improved in which the cobalt monoxide in the positive electrode is fully oxidized during the initial charge thus increasing a amount of remaining capacity area to be developed in the hydrogen absorbing alloy negative electrode, so that the operative life for cycle operation is extended and the over-charge characteristics are enhanced. Accordingly, the cell can perform its function satisfactorily if it has been initially charged with electricity 1.5 times or more greater than the electricity required to oxidize the cobalt monoxide to cobalt oxy-hydroxide and, subsequently has acquired 15% or more of its capacity. In the test cell of No. 14, the current was varied during the initial charge for the purpose of shortening the initial charge process so that the charge was made to 150%. As the result, the cobalt monoxide in the positive electrode was fully oxidized and simultaneously, an amount of remaining capacity area to be developed in the negative electrode was fully increased. Test cell No. 10 was initially charged for the same period as is required for the cobalt monoxide to be oxidized completely into cobalt oxy-hydroxide. Only part of the electricity for the simultaneous oxidation of the nickel hydroxide to nickel oxy-hydroxide was consumed for the oxidation of the cobalt monoxide. Thus, the cobalt monoxide could not be completely oxidized into cobalt oxy-hydroxide, and the rate of use of the positive electrode was low.

EXAMPLE 24

90 parts by weight of nickel hydroxide powder and 10 parts by weight of cobalt monoxide powder covered with a $Co_3O_4$ layer of 10% by weight were dry mixed with CMC and PTFE and added with deionised water for preparing a paste. The paste was then applied to a nickel sintered fiber core which was in turn dried, pressed, and trimmed for producing a non-sinter type nickel positive electrode which has a nickel hydroxide theoretical capacity of 1051 mAh and requires 117.0 mAh of electricity for oxidization of the cobalt monoxide.

Separately, 100 parts by weight of hydrogen absorbing alloy powder similar to that of Example 1 and 1 part by weight of furnace black having a specific surface area of 800 $m^2/g$ were added to sodium polyacrylate, PTFE, and CMC and mixed together under the presence of water for preparing a paste. The paste was then applied to a punched metal which was in turn dried, pressed, and trimmed for producing a hydrogen absorbing alloy negative electrode which has a capacity of 2929 mAh equal to 2.50 times the sum of the nickel hydroxide capacity in the positive electrode and the electricity needed for oxidization of the cobalt monoxide.

The non-sinter type nickel positive electrode and the hydrogen absorbing alloy negative electrode separated by a separator made of polypropylene nonwoven material having a texture size of 75 $g/m^2$ and a thickness of 0.15 mm, were arranged in spiral form and placed in a cylindrical enclosure made of soft steel having a bottom and filled with an alkali electrolyte consisting of a mixture solution of 7N-KOH and 1N-LiOH, constituting a nickel-metal hydride secondary cell which provides a theoretical capacity of 1051 mAh and has an arrangement similar to that shown in FIG. 1.

The nickel-metal hydride secondary cell of Example 24 was left at the room temperature for 24 hours to allow the separator to be saturated with the alkali electrolyte. Then, the cell are charged at 0.2 CmA to 150% the theoretical capacity thereof and completely discharged at 0.2 CmA. This cycle procedure was repeated ten times and then, the utilization was measured. The result revealed 95g of the utilization showing a higher capacity.

Further, the secondary cell of Example 24 was charged and discharged 20 times. Then, its capacity was measured when it was discharged at 1 CmA until the discharge voltage fell below 1 V. Also, its capacity was measured when it was discharged at 5 CmA until the discharge voltage fell below 1 V. The ratio of the 1 CmA discharge capacity to the 5 CmA discharge capacity was about 80%. Hence, there was no problem resulting from the decrease of the 5 CmA discharge capacity, and the cell performed its function well.

Also, the cell was charged at 1 CmA to 150g the cell capacity and discharged at 1 CmA until the discharge voltage decreased to 0.8 V. This cycle procedure was repeated and the number of the cycles were counted until the discharge capacity falls below 50g of the initial charge. The result was 1452 cycles exceeding 500 cycles equal to the average operative life of a known nickel-cadmium secondary cell and thus, exhibiting an increase in the operative life for charge and discharge cycle operation.

EXAMPLE 25

A non-sinter type nickel positive electrode, a hydrogen absorbing alloy negative electrode, and a separator of polypropylene unwoven material which all were similar to those of Example 24, were combined together, constituting a test cell having an arrangement similar to that shown in FIG. 4.

The test cell of Example 25 was then repeatedly charged and discharged at a current of 150 mA in 1 g of hydrogen absorbing alloy of the negative electrode. During the 10th cycle operation, the voltage at the negative electrode relative to the reference electrode was measured. The resultant measurement exhibited an improved potential characteristic, as well as Example 5, enhancing the capacity of the cell.

EXAMPLE 26

A non-sinter type nickel positive electrode, a hydrogen absorbing alloy negative electrode, and a separator of polypropylene unwoven material—all similar to those of Example 24—were combined together, constituting an AA-size test cell having a theoretical capacity of 1000 mAh an arrangement similar to that shown in FIG. 5.

The AA-size test cell of Example 26 was initially charged at 100 mA for 15 hours and discharged at 1 A to 0.8 V. Then, the cell was recharged at 1 A for 1.5 hours and discharged at 1 A 0.8 V. This procedure was repeated and at the 30th cycle, an over-discharge test was conducted for measurement of variations with time in the inner pressure using a pressure detector installed in the cell. The result indicated that the negative electrode of the cell efficiently reacted with oxygen gas during the over-charge and hydrogen gas during the over-discharge causing almost no increase in the inner pressure.

EXAMPLE 27

A non-sinter type nickel positive electrode, a hydrogen absorbing alloy negative electrode, and a separator of polypropylene unwoven material—all similar to those of Example 24—were combined together, constituting an AA-size test cell having a theoretical capacity of 1000 mAh and an arrangement similar to that shown in FIG. 5. The cell was left at a temperature of 45° C. for 24 hours and then, initially charged at a current of 0.5 CmA to 150% of the cell capacity.

After the initial charge, the test cell was examined for 1) inner pressure behavior during the initial charge, 2) the remaining capacity of the hydrogen absorbing alloy negative electrode, 3) the operative life for cycle procedure, and 4) inner pressure behavior during the over-discharge. As the resultant measurements indicated, the inner pressure did not reach 15 kgf/cm$^2$ equal to the activating pressure of a safety valve during both the initial charge and over-discharge procedures thus being properly controlled. Also, the negative electrode spared 10g for the remaining capacity having a charged area partially. Hence, the operative life of the cell is increased ensuring more than 500 cycle procedures. This is achieved because the utilization of the positive electrode is improved by appropriate oxidization of the cobalt monoxide during the initial charge while an amount of remaining capacity area to be generated in the hydrogen absorbing alloy negative electrode is increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A nickel-metal hydride secondary cell comprising:
    a non-sinter type nickel positive electrode accommodated in an enclosure and comprised of a conductive core and a layer formed on the conductive core, said layer made of a mixture of nickel hydroxide powder and cobalt monoxide powder covered with a layer of high-valence cobalt oxide;
    a hydrogen absorbing alloy negative electrode accommodated in said enclosure and comprised of a conductive core and a layer formed on the conductive core and made of a mixture hydrogen absorbing alloy powder and carbon black having a specific surface area of 700 m$^2$/g or more, and having a capacity 1.0 to 2.5 times the sum of the capacity of the nickel hydroxide contained in said positive electrode and the electricity required to oxidize the cobalt monoxide powder;
    a separator made of synthetic resin unwoven fabric having a texture size of 50 to 100 g/m$^2$ and a thickness of 0.1 to 0.25 mm, and located between said positive electrode and said negative electrode; and
    alkali electrolyte contained in said enclosure.

2. A secondary cell according to claim 1, wherein a current of 0.05 to 1 CmA is supplied to charge the cell initially, for a period during which an amount of electricity is applied which is 1.5 times or more the electricity required to oxidize the cobalt monoxide contained in said positive electrode into cobalt oxy-hydroxide.

3. A nickel-metal hydride secondary cell comprising:
    a non-sinter type nickel positive electrode accommodated in an enclosure and comprised of a conductive core and a layer formed on the conductive core, said layer made of a mixture of nickel hydroxide powder and cobalt monoxide powder covered with a layer of high-valence cobalt oxide;
    a hydrogen absorbing alloy negative electrode accommodated in said enclosure and comprised of a conductive core and a layer formed on the conductive core and made of a mixture hydrogen absorbing alloy powder and carbon black having a specific surface area of 700 m$^2$/g or more, and having a capacity 1.0 to 2.5 times the sum of the capacity of the nickel hydroxide contained in said positive electrode and the electricity required to oxidize the cobalt monoxide powder;
    a separator made of synthetic resin unwoven fabric and located between said positive electrode and said negative electrode; and
    alkali electrolyte contained in said enclosure.

4. A secondary cell according to claim 3, wherein a current of 0.05 to 1 CmA is supplied to charge the cell initially, for a period during which an amount of electricity is applied which is 1.5 times or more the electricity required to oxidize the cobalt monoxide contained in said positive electrode into cobalt oxy-hydroxide.

5. A nickel-metal hydride secondary cell comprising:
a non-sinter type nickel positive electrode accommodated in an enclosure and comprised of a conductive core and a layer formed on the conductive core, said layer made of a mixture of nickel hydroxide powder and cobalt monoxide powder covered with a layer of high-valence cobalt oxide;
a hydrogen absorbing alloy negative electrode accommodated in said enclosure and comprised of a conductive core and a layer formed on the conductive core and made of a mixture hydrogen absorbing alloy powder and conductive material powder and having a capacity 1.0 to 2.5 times the sum of the capacity of the nickel hydroxide contained in said positive electrode and the electricity required to oxidize the cobalt monoxide powder;
a separator made of synthetic resin unwoven fabric having a texture size of 50 to 100 g/m$^2$ and a thickness of 0.1 to 0.25 mm, and located between said positive electrode and said negative electrode; and
alkali electrolyte contained in said enclosure.

6. A secondary cell according to claim 5, wherein a current of 0.05 to 1 CmA is supplied to charge the cell initially, for a period during which an amount of electricity is applied which is 1.5 times or more the electricity required to oxidize the cobalt monoxide contained in said positive electrode into cobalt oxy-hydroxide.

7. A nickel-metal hydride secondary cell comprising:
a non-sinter type nickel positive electrode accommodated in an enclosure and comprised of a conductive core and a layer formed on the conductive core, said layer made of a mixture of nickel hydroxide powder and cobalt monoxide powder covered with a layer of high-valence cobalt oxide;
a hydrogen absorbing alloy negative electrode accommodated in said enclosure and comprised of a conductive core and a layer formed on the conductive core and made of a mixture hydrogen absorbing alloy powder and conductive material powder, and having a capacity 1.0 to 2.5 times the sum of the capacity of the nickel hydroxide contained in said positive electrode and the electricity required to oxidize the cobalt monoxide powder;
a separator made of synthetic resin unwoven fabric and located between said positive electrode and said negative electrode; and
alkali electrolyte contained in said enclosure.

8. A secondary cell according to claim 7, wherein a current of 0.05 to 1 CmA is supplied to charge the cell initially, for a period during which an amount of electricity is applied which is 1.5 times or more the electricity required to oxidize the cobalt monoxide contained in said positive electrode into cobalt oxy-hydroxide.

9. A nickel-metal hydride secondary cell comprising:
a non-sinter type nickel positive electrode accommodated in an enclosure and comprised of a conductive core and a layer formed on the conductive core, said layer made of a mixture of nickel hydroxide powder and cobalt monoxide powder covered with a layer of high-valence cobalt oxide;
a hydrogen absorbing alloy negative electrode accommodated in said enclosure and comprised of a conductive core and a layer formed on the conductive core and made of a mixture hydrogen absorbing alloy powder and conductive material powder;
a separator made of synthetic resin unwoven fabric and located between said positive electrode and said negative electrode: and
alkali electrolyte contained in said enclosure.

10. A secondary cell according to claim 9, wherein a current of 0.05 to 1 CmA is supplied to charge the cell initially, for a period during which an amount of electricity is applied which is 1.5 times or more the electricity required to oxidize the cobalt monoxide contained in said positive electrode into cobalt oxy-hydroxide.

* * * * *